(12) United States Patent
Wu

(10) Patent No.: US 10,241,962 B2
(45) Date of Patent: Mar. 26, 2019

(54) METHOD AND SYSTEM OF VIRTUAL WORKSPACE LINKING DATA WITH LOCATION

(71) Applicant: Wei Wu, Wenzhou (CN)

(72) Inventor: Wei Wu, Wenzhou (CN)

( * ) Notice: Subject to any disclaimer, the term of this patent is extended or adjusted under 35 U.S.C. 154(b) by 111 days.

(21) Appl. No.: 15/035,225

(22) PCT Filed: Nov. 7, 2014

(86) PCT No.: PCT/CN2014/090659
§ 371 (c)(1),
(2) Date: May 7, 2016

(87) PCT Pub. No.: WO2015/070736
PCT Pub. Date: May 21, 2015

(65) Prior Publication Data
US 2016/0275153 A1  Sep. 22, 2016

(30) Foreign Application Priority Data
Nov. 12, 2013 (CN) .......................... 2013 1 0562306

(51) Int. Cl.
*G06F 17/30* (2006.01)
*G06F 16/248* (2019.01)
(Continued)

(52) U.S. Cl.
CPC ........ *G06F 16/248* (2019.01); *G06F 3/04842* (2013.01); *G06F 3/04845* (2013.01);
(Continued)

(58) Field of Classification Search
CPC ......... G06F 17/30525; G06F 17/30997; G06F 17/241; G06F 17/30067; G06F 17/30876;
(Continued)

(56) References Cited

U.S. PATENT DOCUMENTS

| | | | | |
|---|---|---|---|---|
| 8,732,290 | B2 * | 5/2014 | Goswami | G06Q 10/103 709/219 |
| 2008/0007568 | A1 * | 1/2008 | Chou | G06T 19/00 345/629 |
| 2012/0089666 | A1 * | 4/2012 | Goswami | G06Q 10/103 709/203 |

FOREIGN PATENT DOCUMENTS

| | | |
|---|---|---|
| CN | 101334445 A | 12/2008 |
| CN | 201590160 U | 9/2010 |

* cited by examiner

*Primary Examiner* — Sheree N Brown

(57) ABSTRACT

The invention discloses a virtual workspace method which allows bidirectional query between data and data locations. The method comprises: establish an image of data source object (DSO), and use the image as a virtual workspace; find virtual location of the data on the virtual workspace corresponding physical location of the data on DSO; annotate data identification information at the virtual location; according to the identification information, one can trace the data by the location, or trace the location by the data. The invention also discloses a system for realizing the method mentioned above, the system comprises: display unit, control unit and data processing unit; the display unit connects the control unit and the data processing unit, the display unit displays the data or the image of DSO, the control unit manipulates the display unit to display the data or the image; the data processing unit treats the data, Applying the method and the system, a link between the data and the location can be established anytime, no matter the data belong to data flow or multimedia information and no matter what location on the data source object the data come from, so that the data may be easily traced from the data location or the data location may be easily traced from the data.

10 Claims, 4 Drawing Sheets

(51) Int. Cl.
  *G06F 16/29* (2019.01)
  *G06F 16/58* (2019.01)
  *G06T 1/00* (2006.01)
  *G06F 3/0484* (2013.01)

(52) U.S. Cl.
  CPC .......... *G06F 16/29* (2019.01); *G06F 16/5866* (2019.01); *G06T 1/00* (2013.01)

(58) Field of Classification Search
  CPC ...... G06F 9/54; G06F 17/30; G06F 17/30038; G06F 17/30292; G06F 17/30315; G06F 17/30336; G06F 17/30557; G06F 17/3056; G06F 17/3061; G06F 17/30731; G06F 17/30864; G06F 17/30882; G06F 17/30884; G06F 3/048; G06F 15/18; G06F 17/24; G06F 17/246; G06F 17/30011; G06F 17/30017; G06F 17/3012; G06F 17/30241; G06F 17/30289; G06F 17/30353; G06F 17/30398; G06F 17/30442; G06F 17/30498; G06F 17/3051; G06F 17/30516; G06F 17/30551; G06F 17/30572; G06F 17/30601; G06F 17/30604; G06F 17/30607; G06F 17/30616; G06F 17/30672; G06F 17/30699; G06F 17/30722; G06F 17/30734; G06F 17/30902; G06F 17/30917; G06F 17/30926; G06F 19/26; G06F 19/3487; G06F 1/00; G06F 1/16; G06F 1/163; G06F 21/00; G06F 21/6218; G06F 2209/541; G06F 2221/2147; G06F 3/00; G06F 3/01; G06F 3/011; G06F 3/016; G06F 3/033; G06F 3/042; G06F 3/0481; G06F 3/0482; G06F 3/04842; G06F 9/4428; G06F 17/30554
  USPC .......................................................... 707/722
  See application file for complete search history.

METHOD AND SYSTEM OF VIRTUAL WORKSPACE LINKING DATA WITH LOCATION

CROSS-REFERENCE TO RELATED APPLICATION

The present application is based on, and claims priority from, Chinese application number 201310562306.1, filed on 12 Nov. 2013, the disclosure of which is hereby incorporated by reference herein in its entirety.

FIELD OF THE INVENTION

The present invention discloses a virtual workspace method and system, especially a virtual workspace method and system linking data with location.

BACKGROUND OF THE INVENTION

During data analysing, sometimes a linkage between the data and data location needs to be established. For example, acquiring and analyzing or treating multiple voltage waveform data from an Equipment Under Test (EUT) with an oscilloscope, sometimes needs to compare data from different locations, that requires tracing the data from the locations; sometimes needs to know the location of the data under analysis, that requires tracing the locations from the data. These requirements are particularly prominent in the fault diagnosis of equipment. A person with ordinary skill in the pertinent art usually writes down the data file name and tags data location on product, makes bidirectional query between data and data location manually which is low efficiency, and could be quite error prone when handling a number of data.

SUMMARY OF THE INVENTION

The purpose of the present invention is to overcome the limitation of prior data treatment or analysis method, by proposing a method and system of virtual workspace method which allows bidirectional query between data and data location, no matter the data belong to data flow or multimedia information and no matter what location on Data Source Object (DSO) the data comes from, a link between data and its location can be established anytime. By means of the link, the data may be easily traced from the location or the location may be easily traced from the data.

The object of the present invention can be achieved through the following technical scheme. First proposing a method of virtual workspace linking data with data location:

A method of virtual workspace linking data with location, wherein it comprises:

Establish an image of DSO, and use the image as a virtual workspace;

Find locations of the data on the virtual workspace corresponding physical locations of the data on DSO;

Annotate data identification information at the locations of the data, according to the identification information, one can trace the data by the locations, or trace the locations by the data.

The method of virtual workspace linking data with location, wherein the image of DSO comprises one or multiple formats of drawing, picture, table or text which can specify the data locations on DSO.

The method of virtual workspace linking data with location, wherein said annotate data identification information on data locations, is carried out by mouse, keyboard or similar device.

The method of virtual workspace linking data with location, wherein the data identification information includes the file name or the memory address of data, or the index information of the file name or the memory address.

The method of virtual workspace linking data with location, wherein the data location may correspond to one or multiple data; the data may correspond to one or multiple data locations.

To achieve above objective of the invention and realize the method of virtual workspace linking data with data location, a system of virtual workspace linking data with data location is proposed here:

A system of virtual workspace, wherein it comprises: a display unit (1), a control unit (2) and a data processing unit (3); the display element (1) connects the control unit (2) and the data processing unit (3); the display unit (1) displays the data or the image of DSO; the control unit (2) manipulates the display unit (1) to display the image or the data; the data processing unit (3) treats the data.

The system of virtual workspace, wherein the display unit (1) displaying the data or the image of DSO, the image comprises one or multiple format of drawing, picture, table or text which can specify the data locations on DSO, and is used as a virtual workspace.

The system of virtual workspace, wherein the control unit (2) includes mouse, keyboard or similar device, and can mark data information on the locations of virtual workspace displayed by display unit (1); the data information at the locations includes the file name or the memory address of stored data, or the index information of the file name or the memory address.

The system of virtual workspace, wherein also contains storage apparatus which can store the data or the image of DSO.

The system of virtual workspace, wherein the control unit (2) can select one or multiple data locations from display unit (1), the virtual workspace, and send data corresponding the data locations to the data processing unit (3) for processing; it may also indicate the corresponding location on the virtual workspace of data being processed by the data processing unit (3).

ADVANTAGES

Compared with the prior art, the method and the system of this invention have advantages including:

1, By establish link between the data and the data location, it is easy to find the data from the data location, or find the data location from the data, enhance work efficiency.

2, the virtual workspace mode is convenient to be applied on a computer.

3, Comparing with recording data and data location manually, present method is more intuitive, accurate and reliable.

Among the figures: display unit (1), control unit (2), data processing units (3)

DETAILED DESCRIPTION OF BEST MODE EMBODIMENTS

With reference to the drawings and embodiments the following gives further detailed explanations of present invention. First the preferred embodiment is given below.

Figure 1:
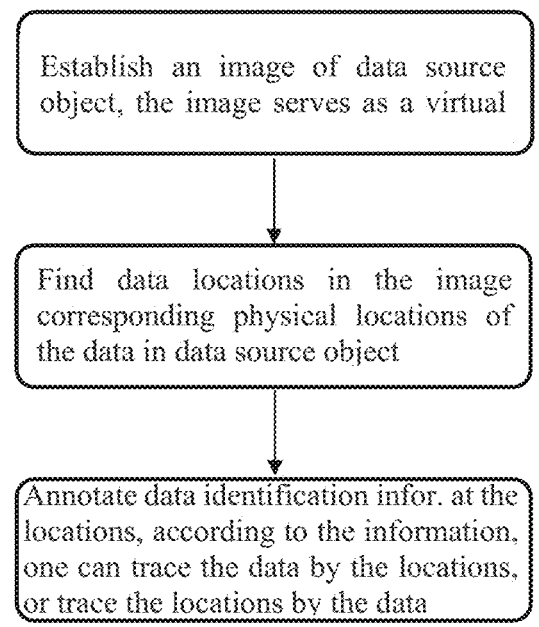
FIG. 1 is a flow chart for the method of present invention.

FIG. 1 is a flow chart of the virtual workspace method of the present invention. The virtual workspace method of present invention, its implementation includes:

1, Build an image of DSO, and use the image as a virtual workspace;

2, Find locations of the data on the virtual workspace corresponding physical locations of the data on DSO;

3, Annotate data identification information at the locations of the data, according to the identification information, one can trace the data by the locations, or trace the locations by the data.

Figure 2:
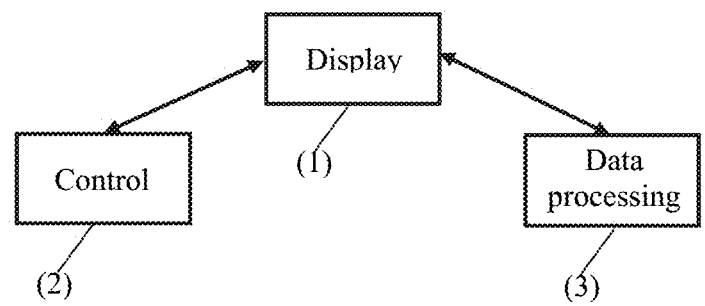
FIG. 2 is a schematic diagram for the system of present invention.

FIG. 2 is a schematic diagram for the system of present invention. As described in FIG. 2, a display unit (1) connects a control unit (2) and a data processing unit (3). The display unit (1) display image of DSO and/or data; the control unit (2) comprising interaction device such as a mouse, a keyboard or a touch screen, controls the display of the display unit (1) or the data processing of date processing unit (3); the data processing unit (3) handles the data processing.

The following embodiments of the invention combining with FIG. 3-FIG. 7 further illustrates the work principle of present invention.

Embodiment 1

Figure 3:
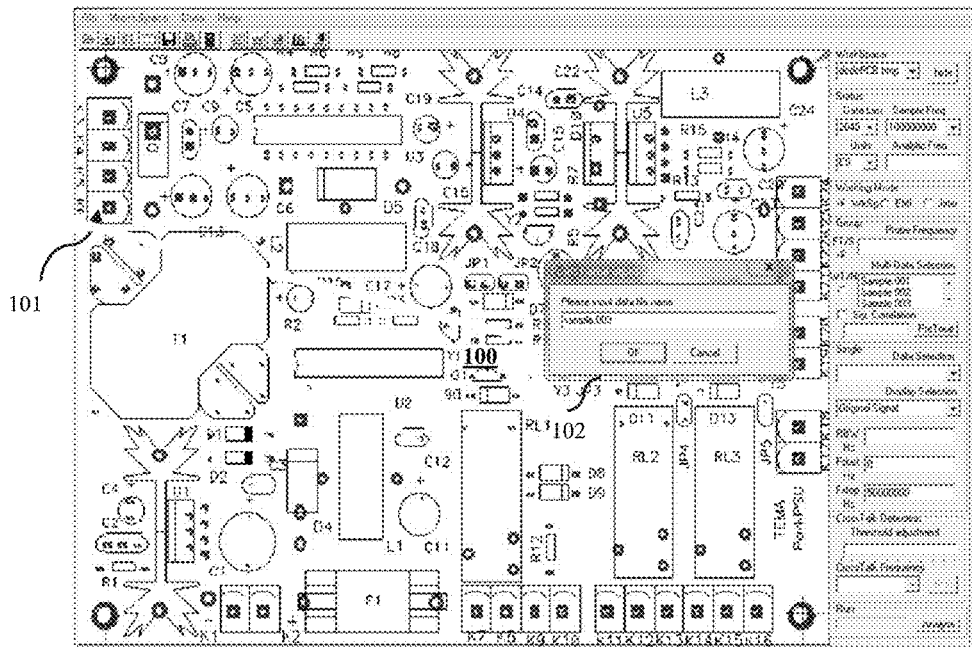
FIG. 3, FIG. 4, FIG. 5 and FIG. 6 are a schematic diagram of embodiment 1 of the present invention.
Figure 4:
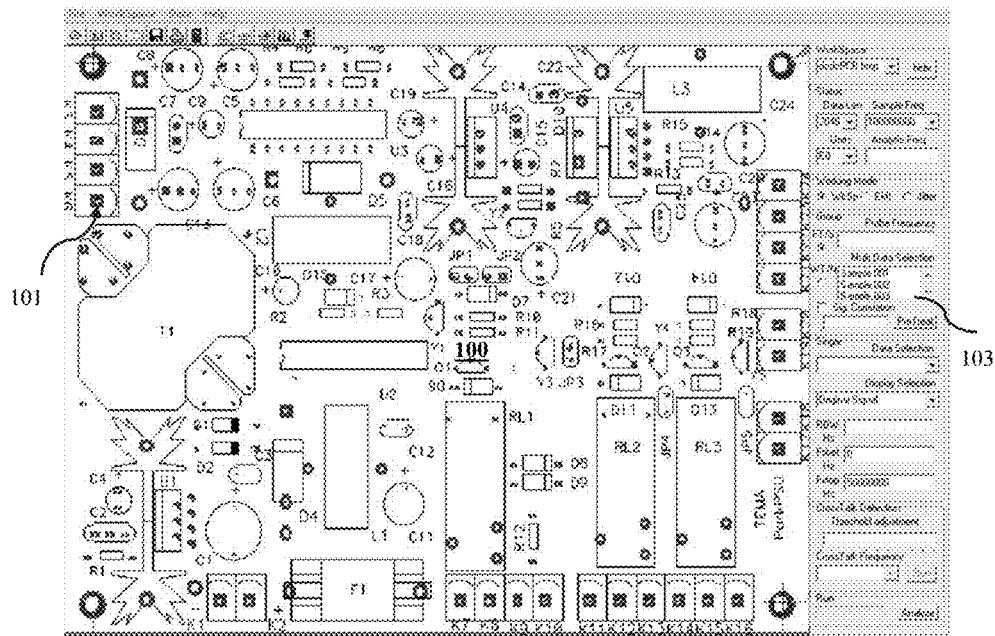
Figure 5:
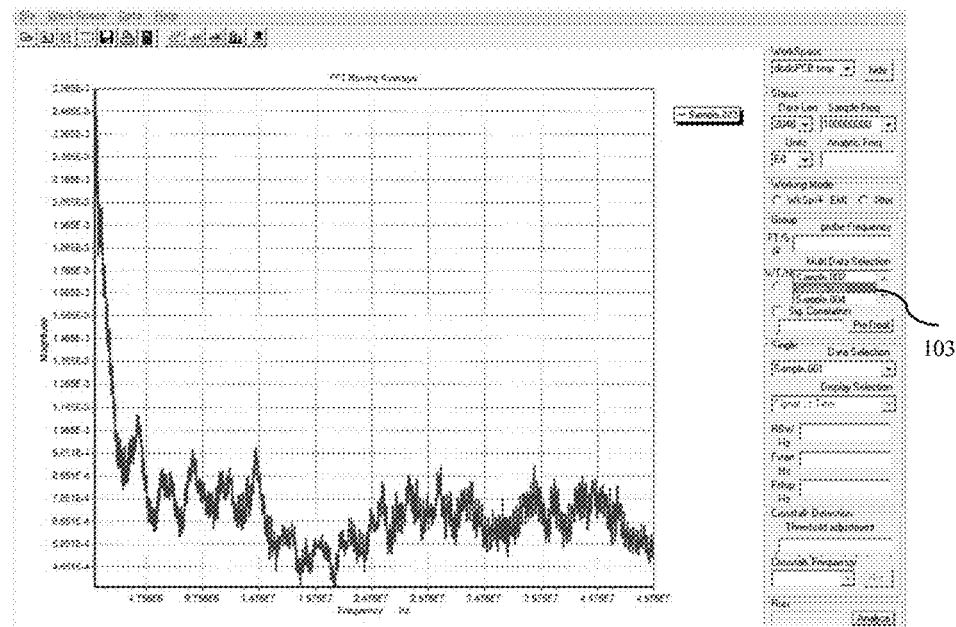
Figure 6:
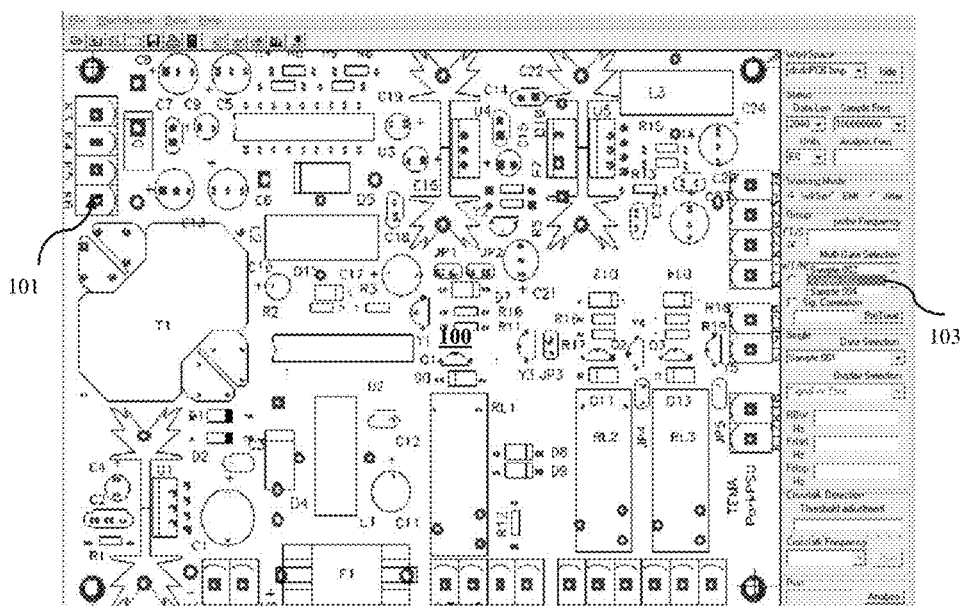

FIG. 3-FIG. 6 explain embodiment 1 of the method and system of the present invention. In this embodiment, the method and system of virtual workspace is realized through programming in format of combination of software and hardware of the computer. The data is voltage signal acquired from a DC/DC converter, DSO of this embodiment. As illustrated in FIG. 3, an image of the converter is loaded on computer and displayed on screen (the display unit (1)), as a virtual workspace (100). Measure a voltage signal from the DC/DC converter electrical circuit at a location which is marked out in FIG. 3 by an arrow (101), with an oscilloscope, and save the measured signal in the computer into a file named "sample.003". Mouse clicking on the marked location (101) in the virtual workspace displayed on screen, a data information annotation dialog window (102) appears, as illustrated in FIG. 3. Enter the data file name "sample.003" to end the data annotation. All of above mentioned information including acquired data, virtual workspace and data identification information are saved on the computer. Further operating the keyboard or mouse, that is, the control unit (2), with a menu function of "input data from virtual workspace" included in the system of this embodiment, the data which are linked with the virtual workspace are loaded (see 103) and waiting to be treated by the data processing unit, as illustrated in FIG. 4. Select data file named "sample.003" from loaded data file list (103) and perform spectrum analysis, that is, treat the data of "sample.003" with data processing unit (3), the result is displayed as illustrated in FIG. 5. During the data analysis, one may trace the location on virtual workspace (100) (image of electric board in this embodiment) of "sample.003" anytime, that is, to display the location on the virtual workspace of data "sample.003" (101) which is under processing by data processing unit (3). The detailed operation includes: selecting "WkSp" option of "work mode" menu at control panel displayed in the display unit (1), the display unit (1) screen will display the virtual workspace (100). Among all the data locations, only one location pointed by an arrow (101), as illustrated in FIG. 6, is marked, indicating this is the physical location on the DSO of the data "sample.003" which is under analysis. Of course, one can also use many other methodologies to indicate a specific data location. For example, highlighting the location, blinking display the location, labeling the location with arrow and so on, that will not be enumerated here.

After the data bearing heavier electromagnetic interference (EMI) is found out by means of data analysis and comparison, one can quickly trace out data location on electric board through the linkage of virtual workspace, and modify the layout or relating components. Repeating above procedure and retest and analysis the data to check the results after the modification, until the EMI on this DC/DC board is reduced.

Embodiment 2

Figure 7:
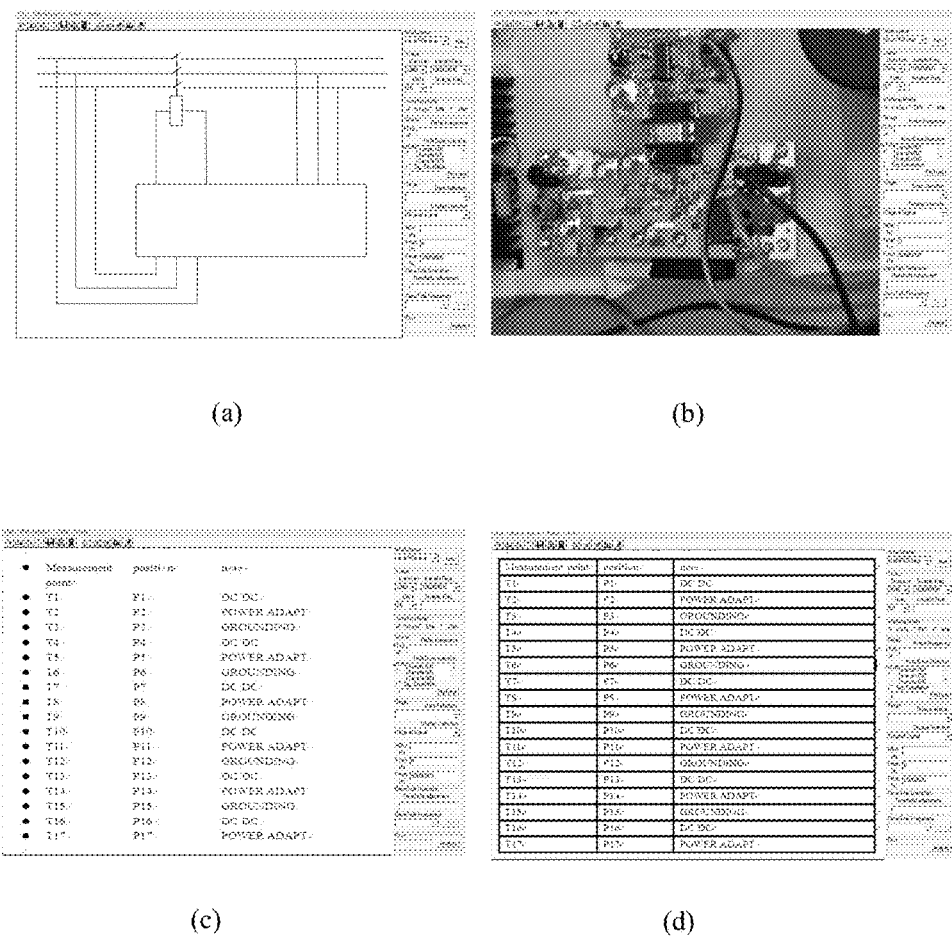
FIG. 7 is a schematic diagram of embodiment 2 of the present invention.

The structure of the embodiment 2 is as same as the structure of the embodiment 1, the difference is, the circuit diagram, image, text and table of the object under test comprise the image used by virtual workspace, illustrated respectively in FIGS. 7 (*a*), (*b*), (*c*) and (*d*). After using methodology of the present invention to find out the data bearing heavier EMI, and traced out the location of the data through the linkage of virtual workspace, and modified the layout or relating components of the location, one need to retest the voltage signal in this location and append the retested data on the location, that will result in a linkage of one location to multiple data. If one marks the same test data on the circuit diagram, the image, the text and the table which comprise the virtual workspace, or one marks the same test data on multiple locations of one portion of virtual workspace (for example, locations along a short conduct), a linkage of one data to multiple locations is obtained.

Embodiment 3

The structure of the embodiment 3 is the same as the structure of the embodiment 1, the difference is, a correlation table comprise number series 1, 2, 3 . . . corresponding data file names is stored in the memory of computer. When annotating the data identification information on the virtual workspace, entry number 1, 2, 3 . . . as the annotation information, the system of this embodiment will search the correlation table to get corresponding data file name. In the same way, associating the number series 1, 2, 3 . . . with the storage address of the data file, may achieve the same results.

The present invention discloses a virtual workspace method and system which allows bidirectional query between data and data locations, no matter the data belong to data flow or multimedia information and no matter what location on data source object the data come from, a link between data and location where the data were acquired can be established anytime, so that the data can be find out according to the data location or the data location can be traced out according to the data easily. Above mentioned embodiments are only part of potential embodiments of the present invention, any modification according to the principle of this invention described above by the designer with ordinary skill in the pertinent art will not change the coverage of this invention.

The invention claimed is:

1. A method of virtual workspace, wherein it comprises:
   display an image of a physical object by a computer, the image serves as a virtual workspace which is an information container containing data from the physical object or retrieval information of the data and positions of the data on the physical object;
   find data locations on the image corresponding data locations on the physical object;
   annotate data identification information including data or data retrieval information at the data locations on the image corresponding the data locations on the physical object to facilitate user tracing the data by the data locations on the physical object, or tracing the data locations on the physical object by the data according to the identification information through the virtual workspace; wherein the virtual workspace contains the image and data of the physical object and the positions of the data on the physical object, position of the data on the physical object is found according to data characteristics through the virtual workspace in which, in case of the physical object is an equipment and the data contains fault information or electromagnetic interference information, position of the fault or electromagnetic interference on the equipment is found by comparing the data; wherein the virtual workspace displays the image and data of the physical object and the positions of the data on the physical object by computer, the data on specific position of the physical object is obtained by visiting the virtual workspace which is running at a computer.

2. The method according to claim 1, wherein the data from the physical object comprise data tested with instrument at specific locations of the physical object.

3. The method according to claim 1, wherein said annotate data identification information on data locations, is carried out by mouse, keyboard or similar device.

4. The method according to claim 1, wherein the data identification information includes file name or storage address of the data, or index information of the file name or storage address.

5. The method according to claim 1, wherein one data location corresponds to one or multiple data; one datum corresponds to one or multiple data locations.

6. A system of virtual workspace, wherein the system comprises: a display unit (1), a control unit (2) and a data processing unit (3); the display unit (1) connects the control unit (2) and the data processing unit (3); the display unit (1) displays data or image of a physical object as a virtual workspace which is an information container containing data from the physical object or retrieval information of the data and positions of the data on the physical object, and the data or the retrieval information of the data is annotated at data locations on the image corresponding data locations on the physical object to facilitate user tracing the data by the data locations on the physical object, or tracing the data locations on the physical object by the data; the control unit (2) manipulates the display unit (1) to display the image or the data; the data processing unit (3) treats the data; wherein the virtual workspace contains image and data of the physical object and positions of the data on the physical object, position of the data on the physical object is found according to data characteristics through the virtual workspace in which, in case of the physical object is an equipment and the data contains fault information or electromagnetic interference information, position of the fault or electromagnetic interference on the equipment is found by comparing the data; wherein the virtual workspace displays the image and data of the physical object and the positions of the data on the physical object by computer, the data on specific position of the physical object is obtained by visiting the virtual workspace which is running at a computer.

7. The system according to claim 6, wherein the data from the physical object comprise data tested with instrument at specific locations of the physical object.

8. The system according to claim 6, wherein the control unit (2) includes mouse, keyboard or similar device, and can mark data location information on the virtual workspace displayed by display unit (1); the data location information includes file name or storage address of stored data, or index information of the file name or storage address.

9. The system according to claim 6, wherein the system also contains storage apparatus which can store the data or the image of the physical object.

10. The system according to claim 6, wherein the control unit (2) can select one or multiple data locations from the display unit (1), and send data corresponding the data locations to the data processing unit (3) for processing; the control unit (2) is also able to indicate the corresponding location on the virtual workspace of the data being processed by the data processing unit (3).

* * * * *